(12) United States Patent
Dwyer

(10) Patent No.: US 6,201,953 B1
(45) Date of Patent: Mar. 13, 2001

(54) METHOD AND APPARATUS FOR ON-BOARD TESTING OF A COMMUNICATION SATELLITE

(75) Inventor: Robert E. Dwyer, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/206,574

(22) Filed: Dec. 7, 1998

(51) Int. Cl.[7] .................................................. H04B 17/00
(52) U.S. Cl. ........................ 455/226.1; 455/67.4; 375/224
(58) Field of Search ................................ 455/12.1, 427, 455/67.1, 67.4, 67.7, 226.1, 226.2, 226.3, 226.4; 375/211, 224, 226, 213, 215, 216

(56) References Cited

U.S. PATENT DOCUMENTS 5,937,004 * 8/1999 Fasulo, II et al. .................... 375/224
6,021,314 * 2/2000 Magana et al. ...................... 455/226.1

* cited by examiner

Primary Examiner—Thanh Cong Le
(74) Attorney, Agent, or Firm—Michael S. Yatsko

(57) ABSTRACT

A system for testing a communication satellite having multiple receiver channels (12), wherein a processor (20) normally used for other satellite functions is also used load and execute a testing module stored in an onboard memory (22). Under control of the testing module, a synthesizer (24) generates test signals and applies them through a controllable switch (30) to a selected receiver channel (12). The test signals are then analyzed by the processor (20) after passing through the selected receiver channel (12) under test. The analysis includes fast Fourier transform (FFT) processing to analyzed channel performance in the frequency domain. An additional feature of the invention allows multiple transmitter channels (46) to be analyzed in turn by a similar technique.

6 Claims, 1 Drawing Sheet

METHOD AND APPARATUS FOR ON-BOARD TESTING OF A COMMUNICATION SATELLITE

BACKGROUND OF THE INVENTION

This invention relates generally to earth-orbiting communication satellites and, more particularly, to techniques for testing communication satellites. Typically, communication satellites have multiple independent communication channels, each of which is subject to the introduction of data errors due to faulty components or unwanted signals impressed on the channel. There are basically two ways to test a communication channel: by measuring bit error rates when the channel is carrying selected digital data, and by measuring the channel's response to the introduction of an analog signal.

Prior to this invention, analog or frequency domain testing has been performed by electrical ground support equipment (EGSE) prior to launch of the satellite, and has imposed a significant burden in terms of additional cost and weight. EGSE testing has required the use of multiple test points in the communication system, to make electrical connection with each communication channel. For example, in a 64-channel satellite, an equal number of couplers, attenuators and associated cables are required. The nature of the integration and test procedure is such that, as a practical matter, these additional components must be carried with the satellite into orbit, even though they are only used during testing on the ground. Although bit error rate testing may be performed while the satellite is in orbit, bit error rate testing does not provide a complete and accurate measure of channel quality and cannot reliably predict communication channel errors.

Accordingly, there is a significant need for a technique that allows frequency domain testing of communication satellites, preferably while the satellites are in orbit. The present invention satisfies this need.

SUMMARY OF THE INVENTION

The present invention resides in a method and apparatus for testing communication satellites in orbit or on the ground, but without a significant penalty in terms of additional weight and cost. Briefly, and in general terms, the apparatus of the invention comprises the following onboard components: a processor used for a variety of satellite control and communication functions; a memory for storing a testing module for loading and execution in the processor; a synthesizer for generating test signals under control of the processor when executing the testing module; and a switch controllable by the processor to connect a test signal from the synthesizer to a selected receiver channel to be tested. The selected receiver channel includes an amplifier and an analog-to-digital converter for converting signals received by the receiver channel to digital form for processing by the processor, and the testing module includes a signal analysis sub-module, for analyzing the test signal applied to the receiver channel under test after the test signal has passed through the receiver channel components. Using the apparatus of the invention, each receiver channel in turn can be tested using onboard components.

More specifically, in accordance with one aspect of the invention, the synthesizer is controlled to generate a signal at a frequency normally handled by the receiver channel under test; and the signal analysis sub-module performs a fast Fourier transform (FFT) function to analyze the receiver channel under test in the frequency domain.

In accordance with a related aspect of the invention, the apparatus is also capable of testing a plurality of transmitter channels in the same communication satellite. For this purpose, the apparatus further comprises means for coupling a test signal from the synthesizer to a selected transmitter channel, and means for coupling output from the selected transmitter channel to the processor, for analysis of transmitter channel performance using the signal analysis sub-module.

The invention may also be defined in terms of a novel method for onboard testing of a communication satellite having a plurality of receiver channels. The method comprises the following steps performed on the satellite: storing a testing module in an onboard memory; loading the testing module into a processor used primarily for a variety of satellite control and communication functions; executing the testing module functions in the processor; generating test signals in an onboard synthesizer under control of the processor when executing the testing module; and connecting a test signal generated in the synthesizer to a selected receiver channel to be tested, through a switch controlled by the processor. The selected receiver channel includes an amplifier and an analog-to-digital converter for converting signals received by the receiver channel to digital form for processing by the processor. The method further includes the steps of analyzing, in a signal analysis sub-module, the test signal applied to the receiver channel under test after the test signal has passed through the receiver channel components; and testing each receiver channel in turn, using the foregoing steps of generating test signals, connecting them to selected receivers in turn, and analyzing the test signals after processing by the receiver channels.

More specifically, the step of generating test signals in the synthesizer includes generating a signal at a frequency normally handled by the receiver channel under test; and the step of analyzing in the signal analysis sub-module includes performing a fast Fourier transform (FFT) function to analyze the receiver channel under test in the frequency domain.

The method may also comprise the steps of coupling a test signal from the synthesizer to a selected transmitter channel of the communication satellite; coupling output from the selected transmitter channel to the processor; and analyzing the performance of the selected transmitter channel performance using the signal analysis sub-module.

It will be appreciated from the foregoing that the present invention represents a significant advance in the field of testing communication satellites. In particular, the invention provides a convenient and reliable technique for testing communication satellites in the frequency domain, both on the ground and while in orbit, with little incremental cost or weight penalty. Other aspects and advantages of the invention will become apparent from the following more detailed description, taken in conjunction with the accompanying drawings.

DESCRIPTION OF THE PREFERRED EMBODIMENT

Figure 1:
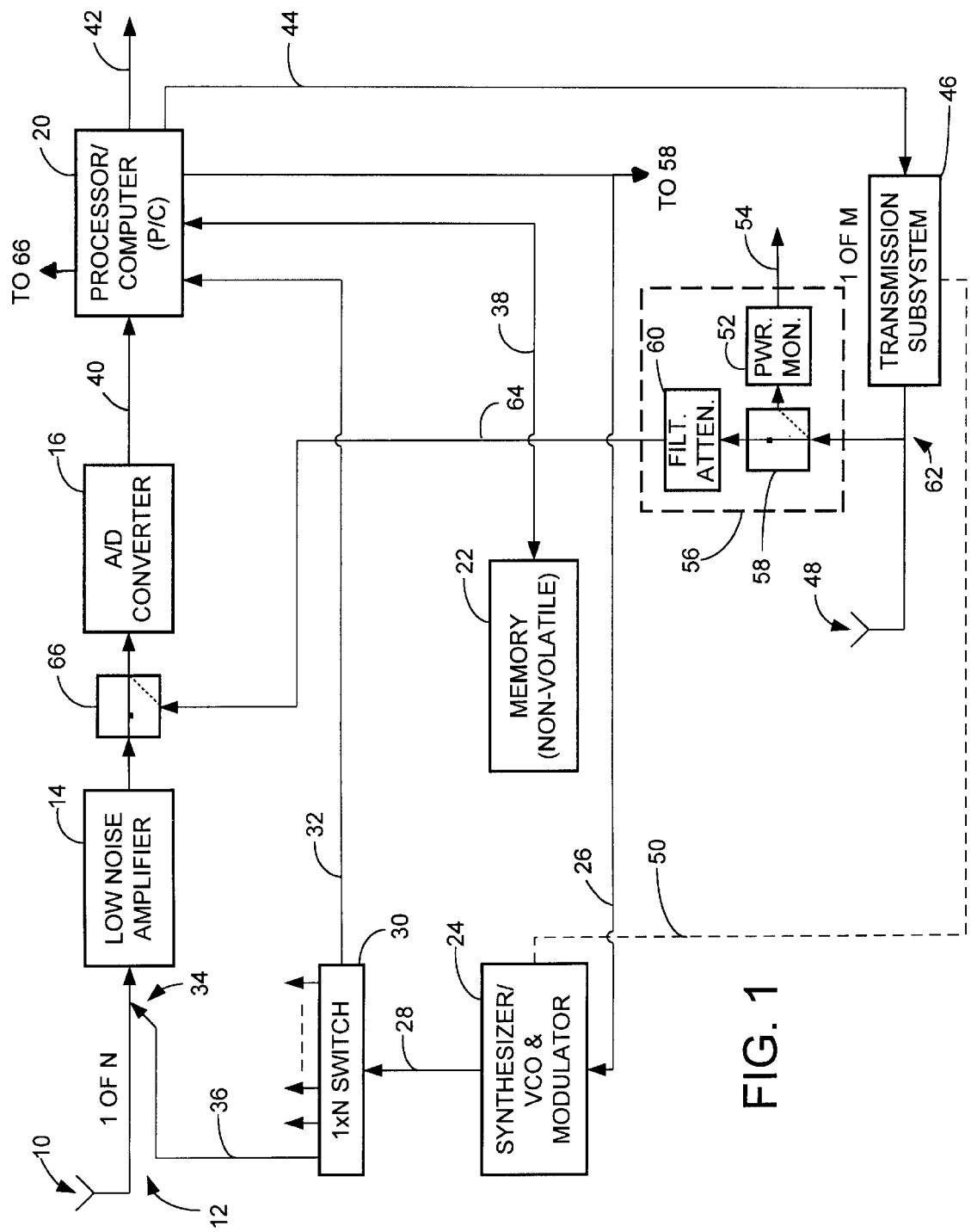
FIG. 1 is a block diagram of a satellite communication system in accordance with the present invention.

As shown in the drawings for purposes of illustration, the present invention pertains to testing techniques for communication satellites. In the past, testing of satellite communication systems in the frequency domain required the addition of costly equipment to facilitate connection to electrical ground support equipment (EGSE).

In accordance with the present invention, testing is accomplished using onboard equipment, which can be employed both in orbit and before launch to perform frequency domain tests or bit error rate tests. As shown in FIG. 1, relevant components of a communication satellite include a receive antenna, indicated by reference numeral 10, and N receiver channels, one of which is shown at 12. Each receiver channel includes a low-noise amplifier 14 and an analog-to-digital converter 16, as well as other conventional components such as filters and mixers, which are not shown in the drawing. It will be understood that some of the receiver channel components may be shared among the channels, depending on design details. The communication satellite also includes a processor/computer (P/C) 20, which performs a variety of tasks, most of which are unrelated to the present invention.

The present invention includes two additional components of the communication system: a memory 22 and a synthesizer 24 that includes a voltage-controlled oscillator (VCO). The synthesizer 24 receives commands from the P/C 20 over line 26, and generates a sinusoidal signal on output line 28, at a frequency selected in accordance with the particular channel being tested. Usually, the selected frequency will be at the center of a frequency band used by the channel under test. The synthesizer 24 is also capable of modulating a carrier signal with test data, for purposes of performing bit error rate testing. The synthesizer output is routed to a selected receiver channel by a 1×N switch 30, under control of command signals received over line 32 from the P/C 20. Each receiver channel includes a coupler 34, through which the synthesizer output signal, on line 36, can be injected into the input of the low-noise amplifier 14. Thus, the synthesizer 24 and the switch 30 cooperate to impress a desired analog test signal on the selected receiver channel, such as receiver channel 12.

The memory 22 contains control software needed to operate the receiver in a test mode. The control software may be installed in the memory before launch, or may be uploaded when the satellite is in orbit. The software is loaded into the P/C 20 over line 38. The P/C then executes the software, which controls the generation of signals in the synthesizer 24, switching of these signals through switch 30 to a selected receiver channel 12 and analysis of resulting signals output by the analog-to-digital converter 16, on line 40, in response to input of the analog test signals derived from the synthesizer.

The software loaded into the P/C 20 also includes a fast Fourier transform (FFT) module that provides an analysis of the output test signal in the frequency domain. Three categories of results are obtainable from the FFT data: a measure of carrier-to-noise ratio, the frequency response of the channel, and detection of possible spurious signals from various sources, which may affect the reliability of the channel. The FFT results, as indicated on output line 42, may be down-linked to a ground station (not shown) for further processing and analysis, or may be further analyzed in the P/C 20.

Conventional down-link data from the satellite is transmitted over line 44 from the P/C to a transmission subsystem 46, and from there to a transmit antenna 48. It will be understood that the latter may be a separate structure from the receive antenna 10, or else a single antenna structure may be shared by the transmit and receive functions of the satellite. Typically, there will be a plurality (M) of transmission subsystems, handling M down-link channels. Another feature of the present invention is that a selected down-link channel can be tested in a way that is analogous to the test procedure described above for the receiver channels.

In accordance with this aspect of the invention, the synthesizer 24 is commanded to generate a desired carrier signal, which is coupled to the transmission subsystem 44 of a selected transmission down-link channel, as indicated by broken line 50. The output of the transmission subsystem 46 is normally connected to a power monitor 52, from which down-link telemetry data signals are derived, as indicated at 54. In the present invention, the power monitor 52 is replaced by an output monitor 56, which includes the power monitor 52, together with a two-way switch 58 and appropriate filtering and attenuator components, indicated by block 60. Output from the transmission subsystem 46 to the transmit antenna 48 is connected by a coupler 62 to the switch 58, which is also controlled by the P/C 20. One of the M transmission subsystems 46 may be selected for testing by controlling the switch 58 to connect the output from coupler 62 through the filter and attenuator 60 and onto line 64. The output signal on line 64 is then input to the analog-to-digital converter 16, through another switch 66 controlled by the P/C 20. In testing the transmission subsystem, a pure sine wave can be introduced to the selected transmission subsystem 46 and its output analyzed in the P/C 20 in the same way that the receive channels are analyzed as described above.

In summary, the present invention permits frequency-domain testing and bit error rate testing of receiver channels, both before launch and while the satellite is in orbit. Moreover, only the channel being tested is interrupted for the test, which achieves the same goals as electrical ground support equipment, but without the high cost and additional weight usually associated with this type of testing. A related aspect of the invention applies similar principles to the testing of transmission subsystems. It will be appreciated that although an embodiment of the invention has been described in detail for purposes of illustration, various modifications may be made without departing from the spirit and scope of the invention. Accordingly, the invention should not be limited except as by the appended claims.

What is claimed is:

1. Apparatus for onboard testing of a communication satellite having a plurality of receiver channels, the apparatus comprising the following components located on the satellite:

a processor used for a variety of satellite control and communication functions;

a memory for storing a testing module for loading and execution in the processor;

a synthesizer for generating test signals under control of the processor when executing the testing module; and a switch controllable by the processor to connect a test signal from the synthesizer to a selected receiver channel to be tested;

wherein the selected receiver channel includes an amplifier and an analog-to-digital converter for converting signals received by the receiver channel to digital form for processing by the processor;

and wherein the testing module includes a signal analysis submodule, for analyzing the test signal applied to the receiver channel under test after the test signal has passed through the receiver channel components;

whereby each receiver channel in turn can be tested using onboard components.

2. Apparatus as defined in claim 1, wherein:

the communication satellite also includes a plurality of transmitter channels; and the apparatus further comprises means for coupling a test signal from the synthesizer to a selected transmitter channel, and means for coupling output from the selected transmitter channel to the processor, for analysis of transmitter channel performance using the signal analysis sub-module.

3. Apparatus as defined in claim 1, wherein:

the synthesizer is controlled to generate a signal at a frequency normally handled by the receiver channel under test; and the signal analysis sub-module performs a fast Fourier transform (FFT) function to analyze the receiver channel under test in the frequency domain.

4. A method for onboard testing of a communication satellite having a plurality of receiver channels, the method comprising the following steps performed on the satellite:

storing a testing module in an onboard memory;

loading the testing module into a processor used primarily for a variety of satellite control and communication functions;

executing the testing module in the processor;

generating test signals in an onboard synthesizer under control of the processor when executing the testing module; and connecting a test signal generated in the synthesizer to a selected receiver channel to be tested, through a switch controlled by the processor;

wherein the selected receiver channel includes an amplifier and an analog-to-digital converter for converting signals received by the receiver channel to digital form for processing by the processor;

analyzing, in a signal analysis sub-module, the test signal applied to the receiver channel under test after the test signal has passed through the receiver channel components; and testing each receiver channel in turn, using the foregoing steps of generating test signals, connecting them to selected receivers in turn, and analyzing the test signals after processing by the receiver channels.

5. A method as defined in claim 4, and further comprising the steps of:

coupling a test signal from the synthesizer to a selected transmitter channel of the communication satellite;

coupling output from the selected transmitter channel to the processor; and analyzing the performance of the selected transmitter channel performance using the signal analysis sub-module.

6. A method as defined in claim 4, wherein:

the step of generating test signals in the synthesizer includes generating a signal at a frequency normally handled by the receiver channel under test; and the step of analyzing in the signal analysis sub-module includes performing a fast Fourier transform (FFT) function to analyze the receiver channel under test in the frequency domain.

* * * * *